(12) United States Patent
Hamasaki

(10) Patent No.: US 10,100,989 B1
(45) Date of Patent: Oct. 16, 2018

(54) DUAL BICYCLE HEADLIGHT AND TAILLIGHT

(71) Applicant: SSB Design, Inc., Irvine, CA (US)

(72) Inventor: Noriaki Hamasaki, Lake Forest, CA (US)

(73) Assignee: SSB DESIGN, INC., Irvine, CA (US)

( * ) Notice: Subject to any disclaimer, the term of this patent is extended or adjusted under 35 U.S.C. 154(b) by 0 days.

(21) Appl. No.: 15/832,427

(22) Filed: Dec. 5, 2017

(51) Int. Cl.
| | |
|---|---|
| F21S 9/00 | (2006.01) |
| F21S 9/02 | (2006.01) |
| G02B 27/30 | (2006.01) |
| F21V 21/08 | (2006.01) |
| F21S 41/141 | (2018.01) |
| F21S 43/14 | (2018.01) |
| F21S 43/20 | (2018.01) |
| B62J 6/02 | (2006.01) |
| B62J 6/04 | (2006.01) |
| B62J 6/00 | (2006.01) |
| F21S 41/20 | (2018.01) |
| B62J 99/00 | (2009.01) |
| F21Y 115/10 | (2016.01) |
| F21Y 113/13 | (2016.01) |

(52) U.S. Cl.
CPC ............... *F21S 9/02* (2013.01); *B62J 6/001* (2013.01); *B62J 6/02* (2013.01); *B62J 6/04* (2013.01); *F21S 41/141* (2018.01); *F21S 41/285* (2018.01); *F21S 43/14* (2018.01); *F21S 43/26* (2018.01); *F21V 21/0816* (2013.01); *G02B 27/30* (2013.01); *B62J 2099/004* (2013.01); *F21Y 2113/13* (2016.08); *F21Y 2115/10* (2016.08)

(58) Field of Classification Search
CPC ........................................................ F21L 4/04
USPC ....................................... 362/191, 473, 476
See application file for complete search history.

(56) References Cited

U.S. PATENT DOCUMENTS

| | | | |
|---|---|---|---|
| 2012/0182748 A1* | 7/2012 | McCaslin | A42B 3/044 362/473 |
| 2013/0182423 A1* | 7/2013 | Matthews | A45F 5/02 362/191 |
| 2014/0232262 A1* | 8/2014 | Wu | H05B 33/0857 315/33 |

* cited by examiner

*Primary Examiner* — Daniel A Hess

(57) ABSTRACT

A dual bicycle headlight and taillight of a compact and lightweight configuration can be mounted on a bicycle handlebars as a headlight to project white light from a white light emitting diode and, alternatively, mounted on a rear of a bicycle as a taillight to project red light from a red light emitting diode. The projected light in both modes of a headlight or a taillight will be parallel to a support surface that the bicycle will traverse. A single flexible mounting strap is rotatably attached to a common light housing to provide a secure mounting of the headlight and taillight modes of operation by the same light housing.

16 Claims, 9 Drawing Sheets

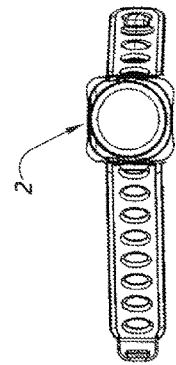
FIG. 7B
For Use As Tail light
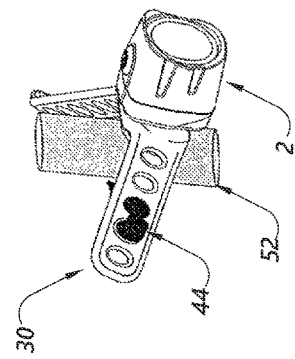
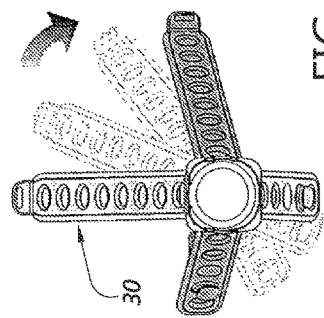
STRAP ROTATION
FIG. 7C
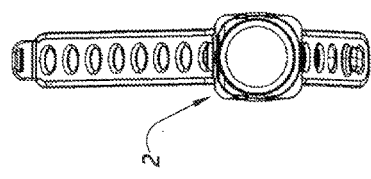
FIG. 7A
For Use As Headlight
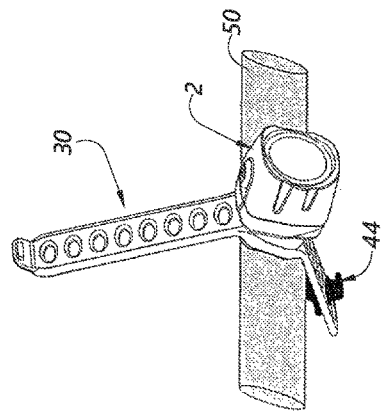

DUAL BICYCLE HEADLIGHT AND TAILLIGHT

1. FIELD OF THE INVENTION

The present invention provides a dual bicycle headlight or taillight that provides a high powered light emitting diode of projected white light of 110 lumens in a compact light housing of one inch in height, width and depth that weighs less than one ounce and also a high powered light emitting diode of projected red light, as a taillight projecting red light, with a flexible mounting strap for connecting to a mounting bracket extending from a back case of the light housing that can keep the white light headlight and the red light taillight positioned to project light parallel to a support surface that the bicycle will traverse.

2. SUMMARY OF THE INVENTION

The present invention provides unique improvements over conventional bicycle lights that are asserted to provide a safety light source that can be mounted on a bicycle or on the bicycle rider such as on a helmet with brackets and clamps.

A respective high powered white light LED and high powered red light LED are focused by one collimator or reflector to provide a headlight, with a light beam angle between 5 and 30 degrees ahead of the cyclist, for increasing a range of vision for navigation of a road ahead with enough illumination for use as a "to see" bicycle headlight. When used as a taillight, the red light can provide a taillight light beam angle projection between 5 and 30 degrees with an ability to also provide a blinking red taillight as an additional safety factor at night A unique orientation of the mounting strap and the angle of a light housing mounting bracket keeps the projected light aimed parallel to the road to provide a best view when used as either a headlight or a taillight, while the flexible mounting strap eliminates any need for two separate mounting brackets to accommodate a handlebar as a headlight and also a seat post as a taillight.

The mounting strap provides an ability to rotate the flexible mounting strap relative to a rear mounting bracket to maintain a proper view angle when used as either a headlight or a taillight.

3. BRIEF DESCRIPTION OF THE DRAWINGS

FIGS. 6A-6H are views of the light housing and flexible mounting strap, where FIG. 6A discloses a front view, FIG. 6B discloses a rear view, FIG. 6C discloses a left side view, FIG. 6D discloses a right side view, FIG. 6E is a top view, FIG. 6F is a bottom view, FIG. 6G is a left isometric view. FIG. 6H is a right isometric view.

FIG. 7A discloses use of the light housing and flexible mounting strap for connection to a handlebar. FIG. 7B discloses the light housing and flexible mounting strap for connection to a bicycle seat post to compensate for a slanting of the seat post of 17 degrees from vertical. FIG. 7C discloses the capability of a strap rotation relative to the light housing.

Figure 8:
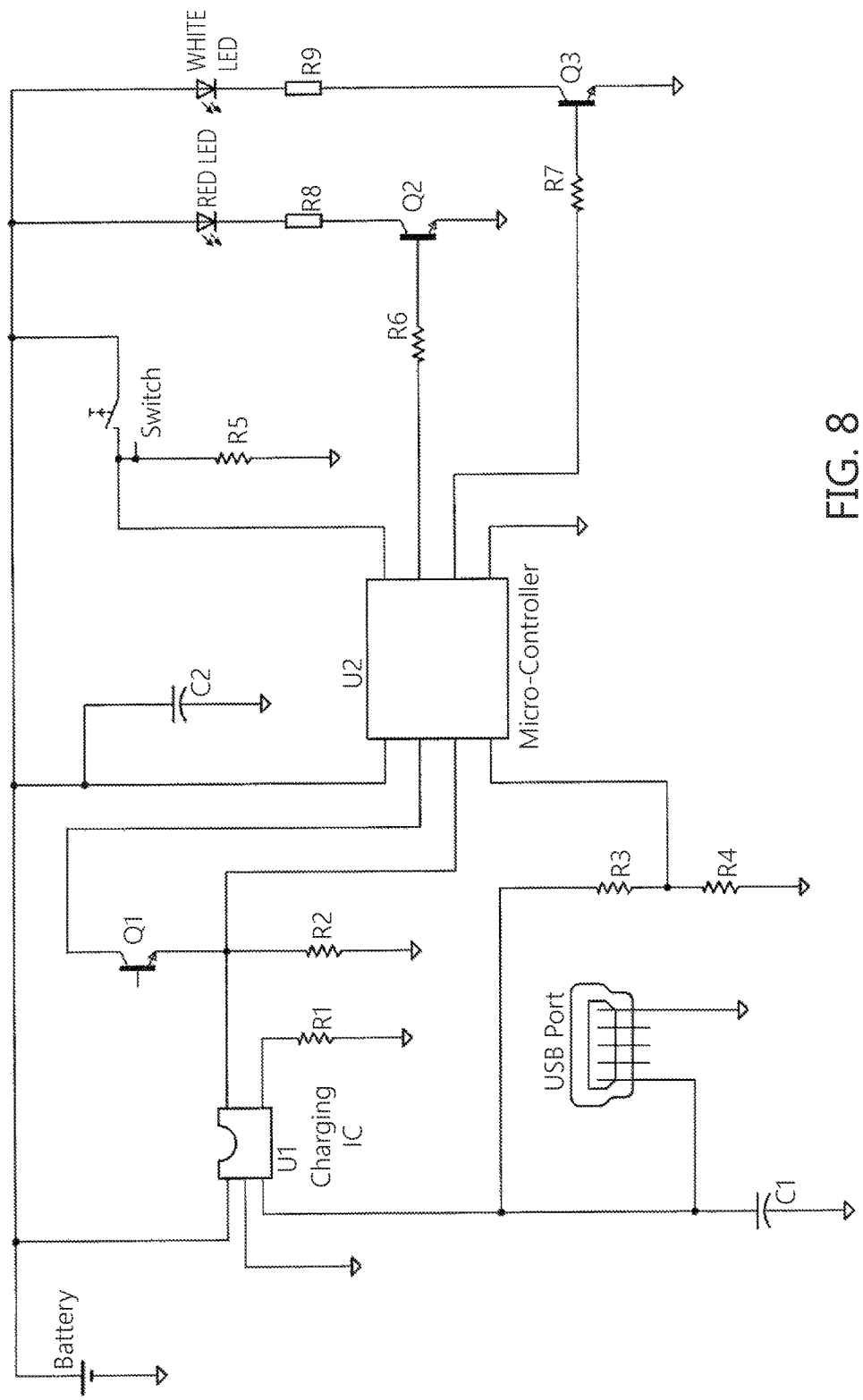

FIG. 8 is a circuit diagram disclosing the mounted components on our printed circuit board.

Figure 9:
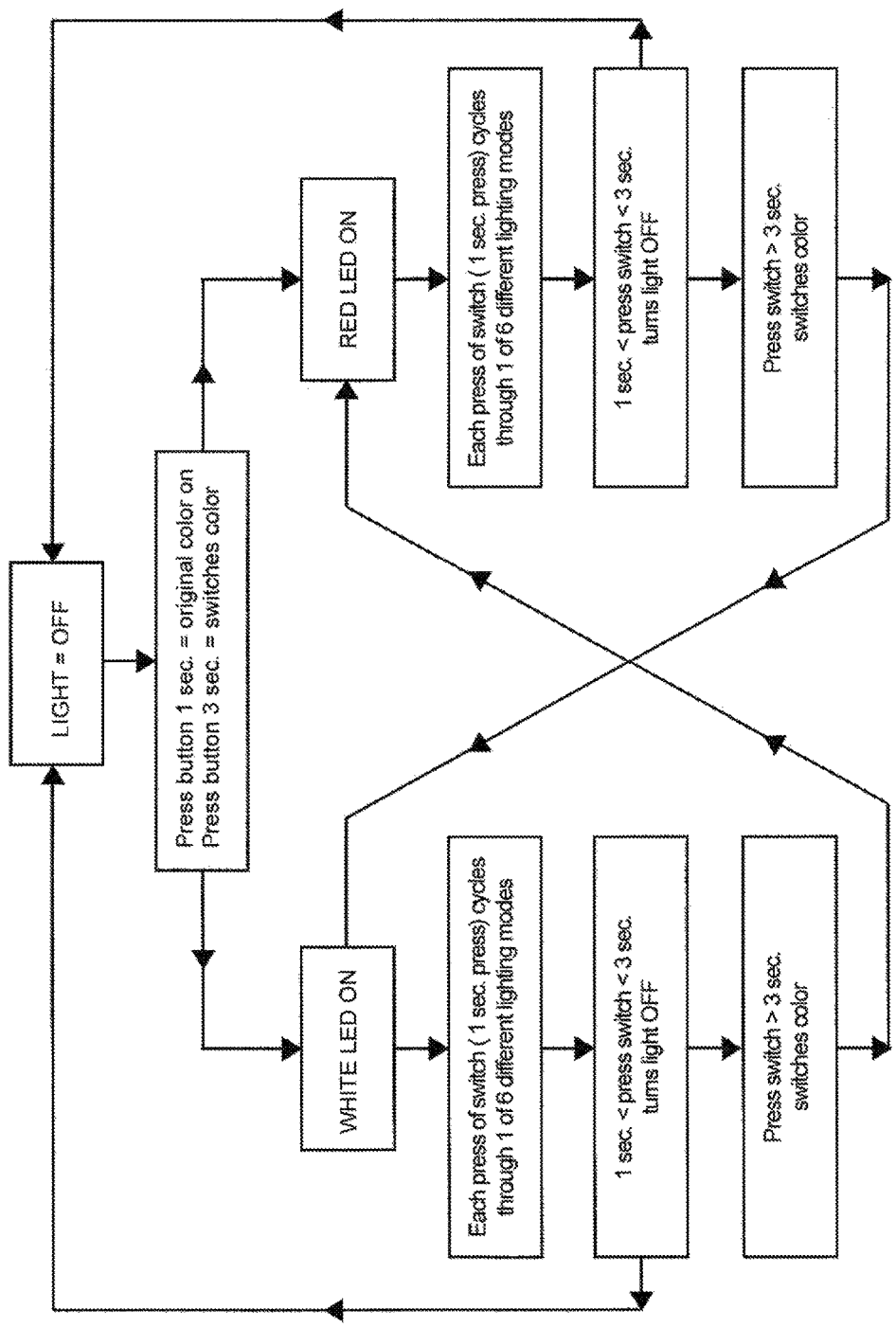

FIG. 9 represents a flow chart for activating the light housing by pressing a flexible button to enter control signals to the printed circuit board.

4. DESCRIPTION OF THE PREFERRED EMBODIMENT

The following description is provided to enable any person skilled in the bicycle field to make and use the invention and sets forth the best modes contemplated by the inventor of carrying out his invention. Various modifications, however, will remain readily apparent to those skilled in these arts, since the generic principles of the present invention have been defined herein specifically to provide an improved dual bicycle headlight and taillight of a compact configuration.

Figure 1:
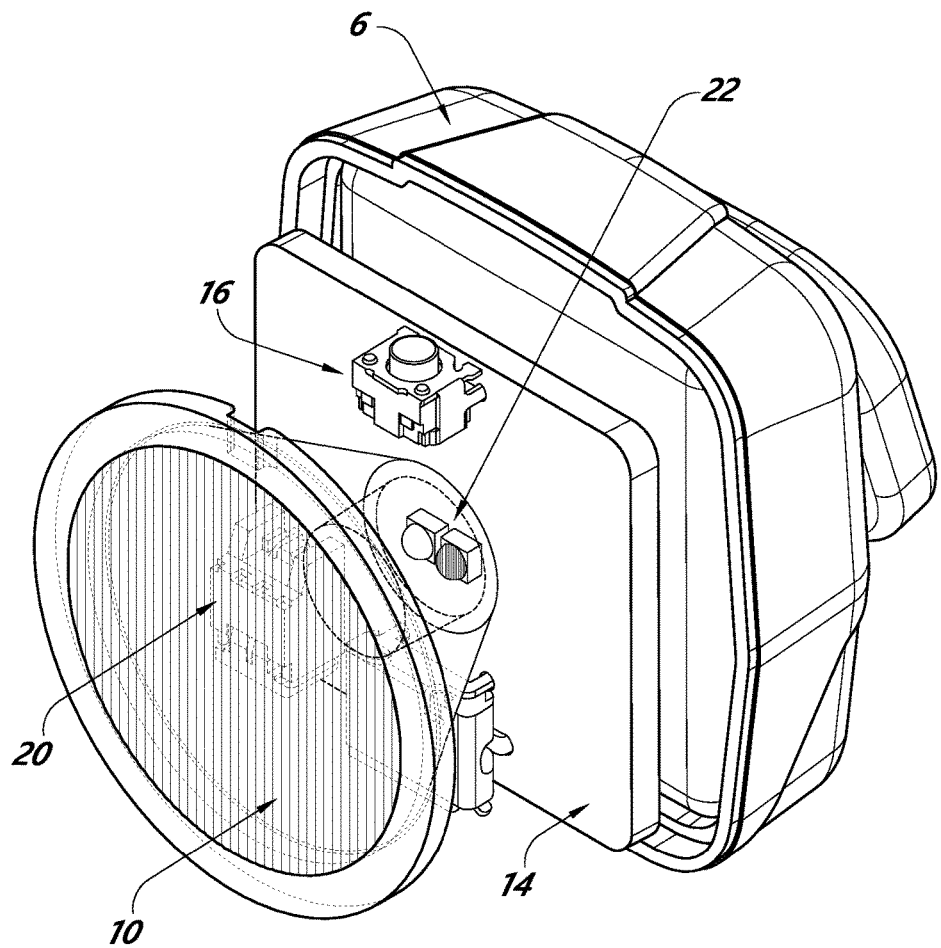
FIG. 1 is a prospective view of the housing light back case, printed circuit board, white and red LEDs, collimator, and front lens.
Figure 2:
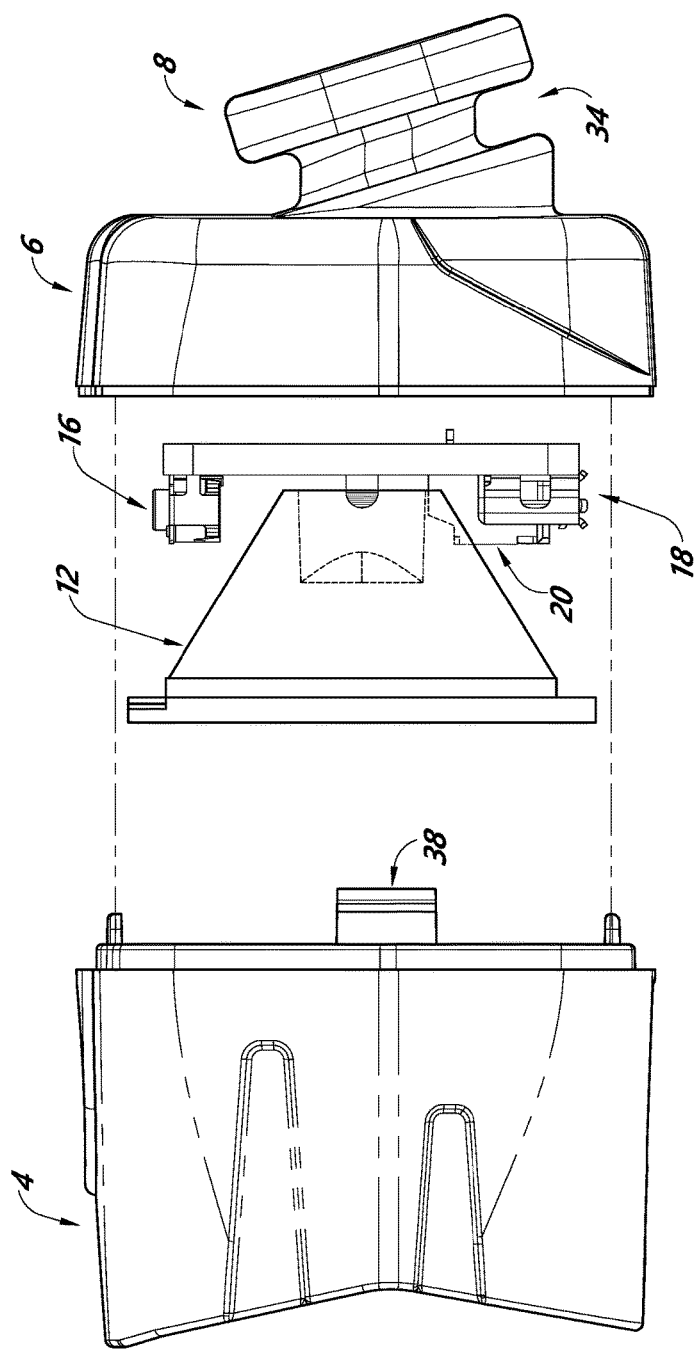
FIG. 2 is an exploded side view of the front and back cases of the light housing with a mounting bracket extending at an angle to the back case and the printed circuit board and collimator.
Figure 4:
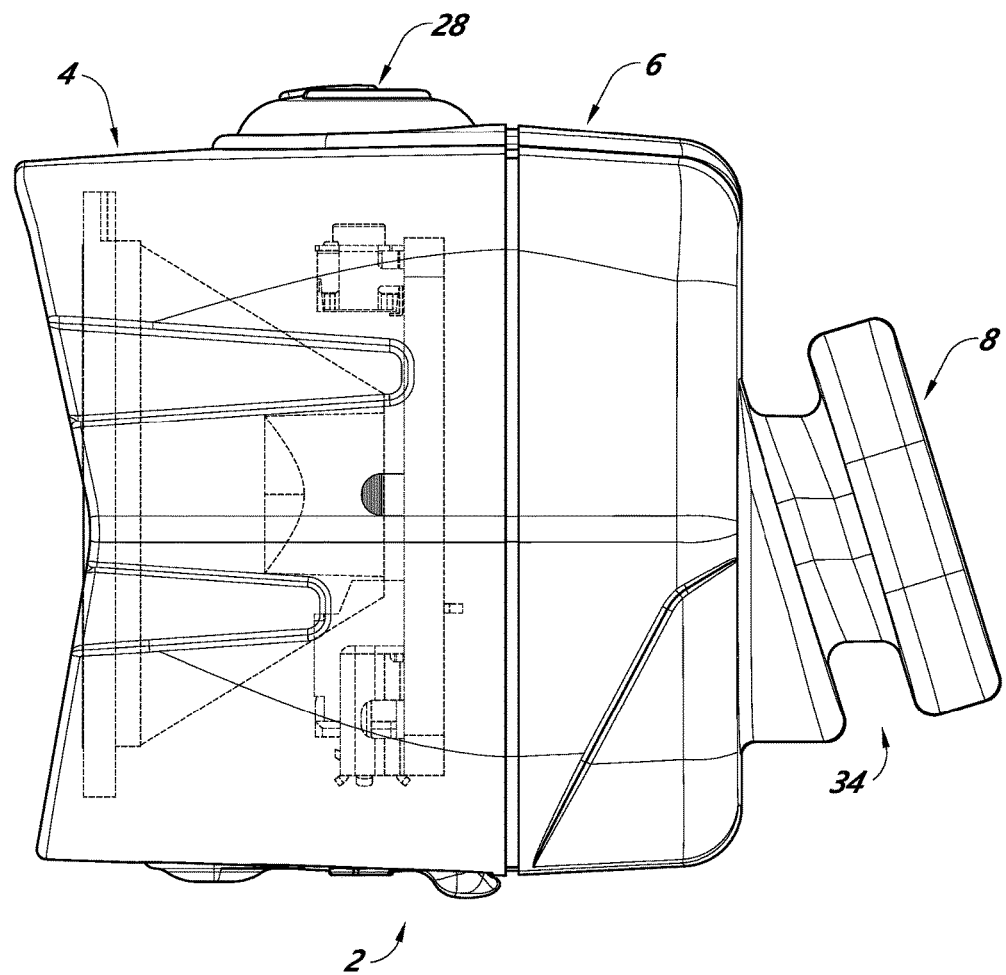
FIG. 4 is a side view of the light housing, with the front case and the back case connected.

A mounting bracket 8 is integrated onto the rear surface of a light housing back case 6 and is slanted at 17 degrees from the vertical to compensate for a bicycle seat post that is also slanted 17 degrees from the vertical, as shown in FIGS. 1, 2 and 4. A flexible mounting strap 30 can be formed from rubber, with a mounting section 32 positioned between the respective ends of the flexible mounting strap 30, and having an opening of a size and configuration for a secure mounting around a recessed stem 34 of a mounting bracket 8. This enables our flexible mounting strap 30 to rotate when mounted on either a handlebar or a seat post to ensure that the light housing 2 can aim the projected light parallel to the ground, when used as either a headlight or a taillight. Thus, a proper view angle for both applications, as either a headlight or a taillight, can be achieved with the use of the rotatable flexible mounting strap 32 with the adjacent slanted design of our mounting bracket 8 projected at 17 degrees from the light housing 2, see FIGS. 7A, 7B and 7C.

By providing a white LED 24 and an adjacent red LED 26, at positions adjacent a focal point of a collimator or reflector, we permit our light housing 2 to be very compact and cost saving, while still providing a dual light of white for a headlight or red for a taillight to enable a minimum of 110 lumen brightness that enables the focusing optic of the collimator or reflector to focus the light beam between 5 and 30 degrees so that the cyclist can see and navigate the road ahead safely in the headlight configuration mounted, for example on the handlebar.

Figure 3:
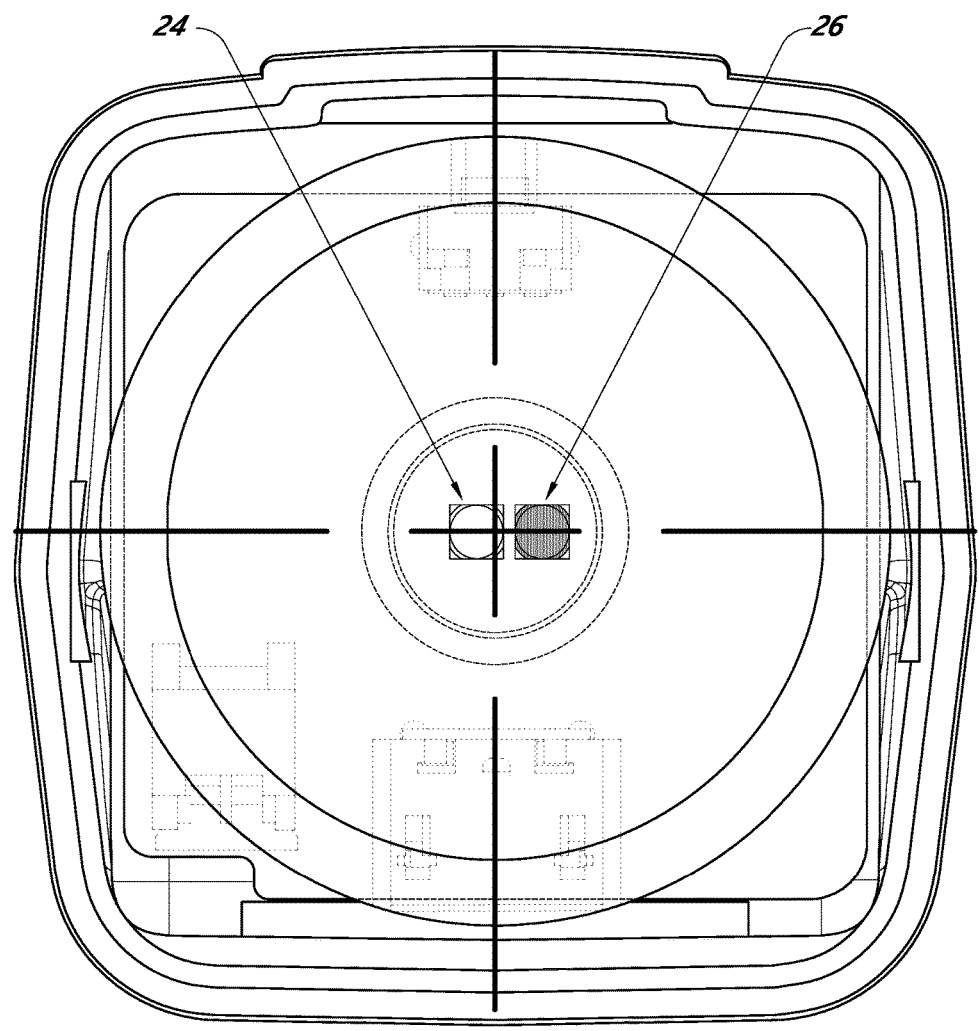
FIG. 3 is a front elevated view of the light housing disclosing the locations of the white LED and red LED, relative to a focal point of the collimator.

In FIG. 3, the location of the focal point of a collimator or reflector is shown with crossed lines in a view perpendicular to the front lens 10. The white LED 24 is positioned closer to the focal point to use the collimator 12 for directing white light as a headlight for the cyclist with adequate direction illumination for driving at night.

The red LED 26 will be used as a taillight and will provide red light parallel to the road or support surface. The red LED 26 can also have red light be directed by the same collimator 12, when positioned as a taillight.

The taillight can provide adequate directed red light or blinking red light without being exactly on the focal point of the collimator to provide a compact and cost efficient light housing 2.

The red light can be projected to focus a red light beam of 30 lumens with an angle between 5 and 30 degrees to the rear of the bicycle when mounted on a seat post to compensate for the 17 degree from vertical arrangement of the seat post. The taillight further provides the option of, not only a light projection parallel to the support surface of a road over which the bicycle will travel, and also a choice of either a steady projection of red light in the taillight mode of operation, or alternatively, a blinking red light in the taillight mode of operation.

FIG. 4 is a side view of the light housing 2 with a front case 4 permanently affixed to a back case 6. A mounting bracket 8 with a recessed stem 34 extends from the back case 6 to provide a 17 degree slant to counter the 17 degree slant of a seat post 52.

On an upper surface of our light housing 2, a flexible input button 28 is an operating control switch, which enables the cyclist to select a white light or a red light and, further, to select a blinking mode of light emission when the light housing is mounted on the bicycle as a taillight. To drive our high powered LED lights, we provide a lithium battery 34 that can be charged through a USB port 18, provided at the bottom of our light housing.

Figure 5:
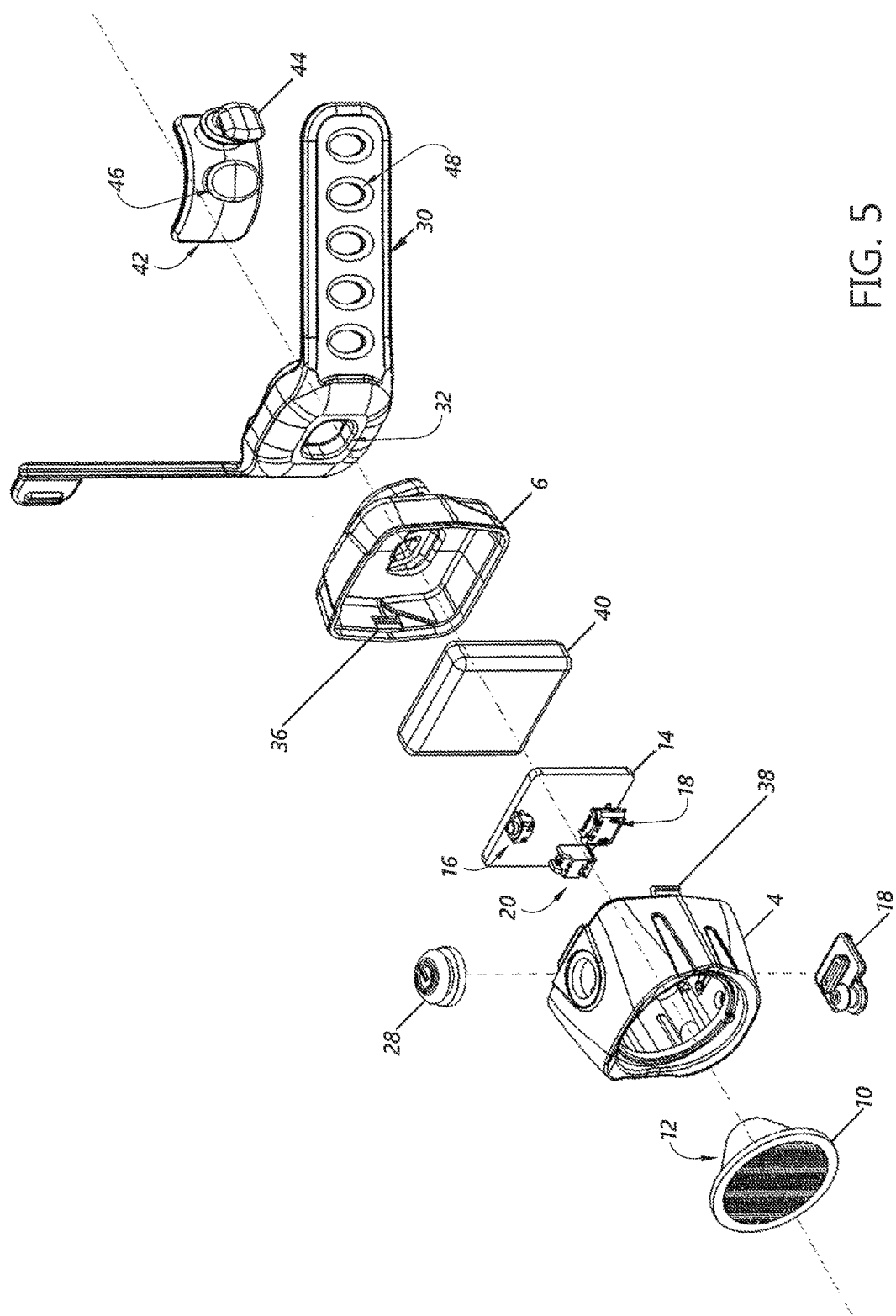
FIG. 5 is an exploded view of the light housing and its components and the relationship of a flexible mounting strap and curved support plate.
Figure 6C:
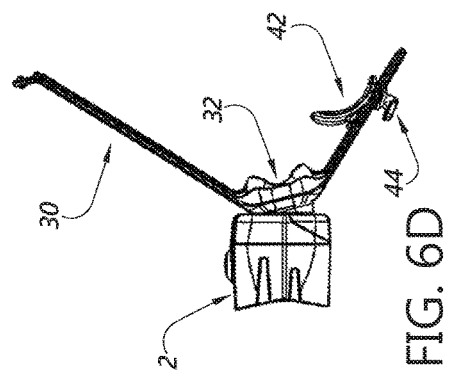
Figure 6D:
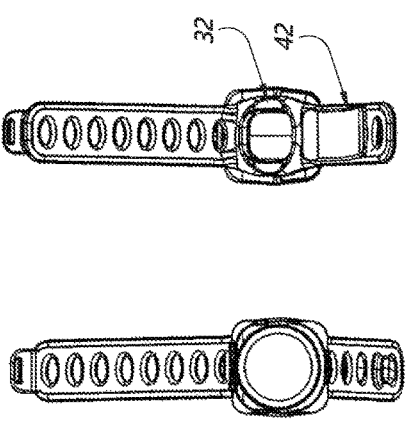
Figure 6B:
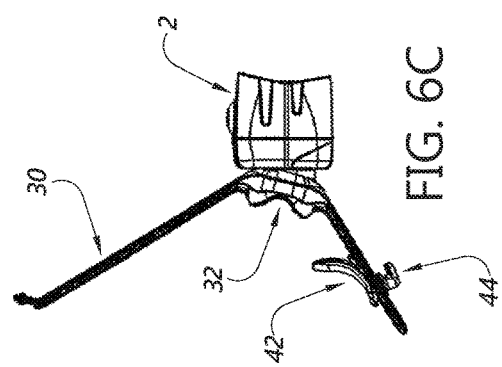
Figure 6H:
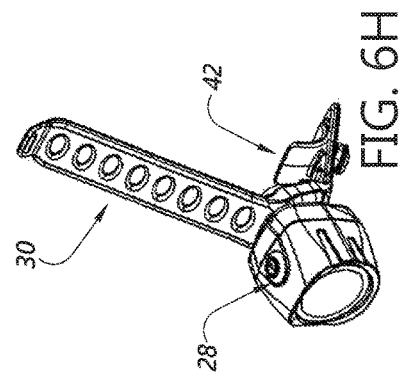
Figure 6G:
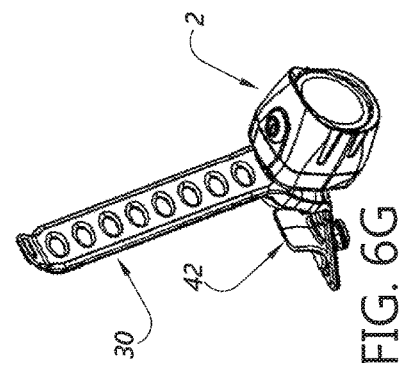
Figure 6F:
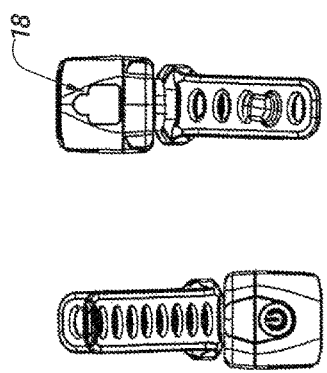

FIG. 5 is an exploded view of the components that provide a dual bicycle headlight and taillight. The light housing front lens 10 and collimator 12 are inserted into the front case 4. The front lens 10 can have a parallel grooved outer surface to spread the light projected by the collimator 12.

A USB port 18 is mounted to extend into the interior of the front case 4 for connection to a charging circuit U1 on the printed circuit board 14.

The front case 4 has a pair of side hooks 38 that can hold the front case 4 against the back case 6, which has recessed retainers 36 on the side interior edges of the back case, to connect to the respective hooks 38. To provide a permanent fixation, glue can be applied along the perimeters of the rear opening of the front case 4 and the front opening of the back case 6.

A flexible input button 28 is attached to an upper opening on the top of the front case and can activate a control switch 16 mounted on the printed circuit board 14.

A battery 40, such as a lithium battery, has a wire for connection to the printed circuit board 14.

The flexible mounting strap 30 has a mounting section 32 that can be mounted on the mounting bracket 8 when the front case 4 and back case 8 have been permanently fastened together. The mounting section opening 32 has a concave perimeter for contacting either a handlebar of a bicycle when mounted to provide a headlight or a seat post when mounted to provide a taillight. The flexible mounting strap 30 is integral with the mounting section and a plurality of spaced oval holes 48 are provided on the flexible mounting straps extending from the mounting section 32 to the respective ends of the flexible mounting strap 30.

As shown in FIGS. 7A, 7B and 7C, the flexible mounting strap 30 can be secured on the recessed stem 34 and be relatively rotated for fixation to the handlebar 50 of a bicycle or a seat post 52 to provide an appropriate source of parallel light to a road or support surface, as either a headlight or a taillight.

An L-shaped fastener 44 can be mounted at a desired position within oval holes 48 on the flexible strap 30 to clamp the handlebar 50 or seat post 52 between a curved support plate 42 and the mounting bracket 8 which adjusts for any slanting of a support member, such as a bicycle seat post 52.

A removable curved support plate 42 can be mounted on our flexible strap 30, where an L-shaped fastener 44 extends from an outer surface of the curved support plate 42, while an oval pedestal 46 adjacent the L-shaped fastener 44 extends also from the outer surface of the curved support plate 42, with the respective oval pedestal 46 and the L-shaped fastener 44 extending through adjacent oval holes 48 in the flexible mounting strap 30 to, thereby, fasten and hold the removable curved support plate 42 at an appropriate position for contacting either a handlebar or a seat post.

A cyclist, when parking a bicycle, can easily remove our dual bicycle light to prevent theft. Our bicycle light weighs approximately 0.7 ounces, while the flexible strap 30 and curved support plate 42 weigh 0.3 ounces.

Accordingly, our fully assembled bicycle light with the flexible strap and curved retainer, along with a lithium battery 34, printed circuit board 14 and light housing configuration collectively weigh one ounce and, due to the small size of the light housing 2, can be easily carried or stored in a pouch by the bicyclist.

The control circuit shown in FIG. 8 uses a micro-computer to activate the appropriate red LED 26 or white LED 24 in response to control signals inputted by a cyclist by pressing the flexible input button 28. Additionally, the lithium battery 40 can be recharged when a source of power is connected to the USB port 18 by a charging circuit U1 on the printed circuit board 14.

A flow chart for activating the LEDs and the modes of bicycling are shown in FIG. 9 and the description of the electrical components are set forth as follows:

| COMPONENT | DESCRIPTION/FUNCTION |
| --- | --- |
| BATTERY | Rechargeable Li-Ion |
| C1 | Capacitor |
| C2 | Capacitor |
| Q1 | Photo transistor to detect ambient light condition (day or night) |
| Q2 | Transistor controlling electrical current to red LED |
| Q3 | Transistor controlling electrical current to white LED |
| R1 | Charge current adjusting resistor |
| R2 | Current limiting resistor |
| R3 | Voltage dividing resistor |
| R4 | Voltage dividing resistor |
| R5 | Current limiting resistor |
| R6 | Current limiting resistor |
| R7 | Current limiting resistor |
| R8 | Current limiting resistor |
| R9 | Current limiting resistor |
| RED LED | 20 lumen or greater output red LED |
| WHITE LED | 100 lumen or greater output white LED |
| SWITCH | Switch for On/Off and scroll through different light modes |
| U1 | Li-Ion charging I.C. |
| U2 | Micro-Controller controls all light modes |
| USB Port | USB port for 5 v power supply |

In summary, we provide a high powered light source that is rechargeable with a lithium battery that provides an extremely light weight and easily mountable headlight or taillight that ensures a proper view angle for either application, whether mounted on the handlebar or on a slanted seat post.

While the above features of the present invention teach apparatus, process and an improved bicycle light, it can be readily appreciated that it would be possible to deviate from the above embodiments of the present invention and, as will be readily understood by those skilled in the art, the invention is capable of many modifications and improvements within the scope and spirit thereof. Accordingly, it will be understood that the invention is not to be limited by the specific embodiments but only by the spirit and scope of the appended claims

I claim:

1. A bicycle light comprising:
a light housing having a collimator aligned within the light housing to focus light from a pair of light emitting diodes mounted at positions in proximity to a focal point of the collimator;
a battery for providing power to the light emitting diodes;
a control circuit for responding to operator input selections to enable the light emitting diodes to be operated as either a headlight or, alternatively, as a taillight; and
a mounting strap connected to the light housing to mount the light housing on one of a front of the bicycle as a headlight and a rear of the bicycle as a taillight;
a mounting bracket extending from a rear of the light housing to provide a mounting position that is slanted relative to a rear surface of the light housing at an angle to compensate for a bicycle seat post that is slanted relative to a plane perpendicular to a support surface that the bicycle can traverse to provide a position of the light housing for emitting light from the light housing parallel to the support surface when connected to the bicycle seat post;
the mounting strap is rotatable relative to the light housing and flexible with a mounting section positioned between the respective ends of the flexible strap and having an opening of a size and configuration for attachment to the mounting bracket;
wherein the flexible mounting strap is integral with the mounting section and a plurality of spaced oval holes are provided on the flexible mounting straps extending from the mounting section to the respective ends of the flexible mounting strap; and
a removable curved retainer for contacting either a handlebar of a bicycle when mounted to provide a headlight or a seat post when mounted to provide a taillight, wherein an L shaped fastener extends from an outer surface of the retainer while an oval pedestal adjacent the L shaped fastener extends from the outer surface of the retainer through an oval hole in the flexible mounting strap to capture the flexible mounting strap with the L shaped fastener extending through an adjacent oval hole to hold the removable curved retainer on the flexible strap.

2. The bicycle light of claim 1 wherein the mounting bracket extending from the rear of the light housing is slanted 17 degrees from a plane perpendicular to the support surface over which the bicycle can travel.

3. The bicycle light of claim 1 wherein the mounting section opening has a concave perimeter for contacting either a handlebar of a bicycle when mounted to provide a headlight or a seat post when mounted to provide a taillight.

4. The bicycle light of claim 1 further comprising:
a white light emitting diode positioned adjacent the focal point of the collimator and;
a red light emitting diode positioned adjacent the white light emitting diode.

5. The bicycle light of claim 4 wherein the control switch is a flexible button mounted on an upper surface of the light housing.

6. The bicycle light of claim 1 wherein the white light emitting diode can be powered to provide 110 lumens of white light when the light housing is mounted on the bicycle as a headlight.

7. The bicycle light of claim 1 wherein the red light emitting diode can be powered to provide 30 lumens of red light when the light housing is mounted on the bicycle as a taillight.

8. The bicycle light of claim 1 wherein the light housing has a control switch on a surface of the light housing that can be pressed to select white light or red light and can be further pressed to select a blinking mode of light emission.

9. The bicycle light of claim 1 wherein the battery is a lithium battery that can be recharged through a USB port on a bottom of the light housing.

10. A combination headlight and taillight for a bicycle comprising:
a light housing having a collimator aligned within the light housing to focus light from a pair of light emitting diodes mounted within the light housing at positions in proximity to a focal point of the collimator;
a rechargeable battery for providing power to the light emitting diodes;
a control circuit for responding to an operator input of pressing a switch on an exterior of the light housing to enable the light emitting diodes to be activated as either a headlight or, alternatively, as a taillight;
a mounting strap connectible to the light housing to mount the light housing on one of a front of the bicycle as a headlight and a rear of the bicycle as a taillight;
wherein the light housing is approximately one inch in height, width and depth and weighs less than one ounce.

11. The combination headlight and taillight for a bicycle of claim 10 further comprising:
a mounting bracket extending from a rear of the light housing to provide a mounting position that is slanted relative to a rear surface of the light housing at an angle to compensate for a bicycle seat post that is slanted relative to a plane perpendicular to a support surface that the bicycle can traverse to provide a position of the light housing for emitting light from the light housing parallel to the support surface when connected to the bicycle seat post; and
the mounting strap is rotatable relative to the light housing and flexible with a mounting section positioned between the respective ends of the flexible strap and having an opening of a size and configuration for attachment to the mounting bracket.

12. The combination headlight and taillight for a bicycle of claim 11 wherein the mounting section opening has a concave perimeter for contacting either a handlebar of a bicycle when mounted to provide a headlight or a seat post when mounted to provide a taillight, and the flexible mounting strap is integral with the mounting section and a plurality of spaced oval holes are provided on the flexible mounting strap extending from the mounting section to the respective ends of the flexible mounting strap, the combined weight of the light housing with the mounting bracket attached to the mounting section of the flexible mounting strap is one ounce.

13. The combination headlight and taillight for a bicycle of claim 10 further comprising:
a flexible button mounted on the exterior surface of the light housing to provide the switch input to the control circuit and the light emitting diodes are mounted within the light housing adjacent a focal point of the collimator with a white light emitting diode positioned closer to the focal point than a red light emitting diode that is adjacent the white light emitting diode.

14. A bicycle light comprising:

a light housing with a collimator to focus light from at least one light emitting source mounted in the light housing at a position in proximity to a focal point of the collimator and having a mounting bracket extending from a rear of the light housing to provide a mounting position that is slanted relative to a plane perpendicular to a support surface that the bicycle would traverse to enable light emitted from the light housing to be parallel to the support surface when connected to a bicycle seat post; and a flexible mounting strap with a mounting section positioned between the respective ends of the strap having an opening of a size and configuration for attachment to the mounting bracket on the light housing and flexible to enable rotation of the mounting strap relative to the mounting bracket for mounting on either the bicycle seat post as a taillight or on a bicycle handlebar as a headlight, wherein the light housing is approximately one inch in height, width and depth and weighs less than one ounce.

15. The bicycle light of claim 14 further comprising a white light emitting diode positioned adjacent the focal point of the collimator and a red light emitting diode positioned adjacent the white light emitting diode, wherein the white light emitting diode is driven by a rechargeable battery in the light housing to provide white light as a headlight, while the red light emitting diode can also be driven by the rechargeable battery to provide red light when the light housing is mounted as a taillight.

16. The bicycle light of claim 14 wherein the mounting section opening has a concave perimeter for contacting either a handlebar of a bicycle when mounted to provide a headlight or a seat post when mounted to provide a taillight.

* * * * *